(12) United States Patent
Nesbitt et al.

(10) Patent No.: US 7,693,873 B2
(45) Date of Patent: Apr. 6, 2010

(54) SYSTEM, METHOD AND PROGRAM TO SYNCHRONIZE FILES IN DISTRIBUTED COMPUTER SYSTEM

(75) Inventors: Richard E. Nesbitt, Holly Springs, NC (US); Brian M. O'Connell, Cary, NC (US); Herbert D. Pearthree, Cary, NC (US); Kevin E. Vaughan, Fuguay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 11/249,531

(22) Filed: Oct. 13, 2005

(65) Prior Publication Data

US 2007/0088755 A1  Apr. 19, 2007

(51) Int. Cl.
*G06F 12/00* (2006.01)
(52) U.S. Cl. ...................... 707/200; 707/205
(58) Field of Classification Search ................ 707/202, 707/200, 205; 395/600; 717/140; 709/219
See application file for complete search history.

(56) References Cited

U.S. PATENT DOCUMENTS

| | | | | |
|---|---|---|---|---|
| 5,237,680 A * | 8/1993 | Adams et al. | ................ | 707/200 |
| 5,953,708 A | 9/1999 | Midorikawa et al. | .......... | 705/26 |
| 6,011,977 A | 1/2000 | Brown et al. | ................ | 455/503 |
| 2002/0093540 A1 | 7/2002 | Mariani et al. | ............... | 345/853 |
| 2002/0184391 A1 | 12/2002 | Phillips | ....................... | 709/248 |
| 2003/0221161 A1 | 11/2003 | Balassanian et al. | ..... | 715/500.1 |
| 2004/0103444 A1 | 5/2004 | Weinberg et al. | ........... | 725/132 |
| 2005/0021866 A1 | 1/2005 | Kang et al. | .................. | 709/248 |
| 2005/0033777 A1 * | 2/2005 | Moraes et al. | ............... | 707/202 |
| 2005/0120059 A1 * | 6/2005 | Verma et al. | ................. | 707/200 |
| 2005/0289524 A1 * | 12/2005 | McGinnes | ................... | 717/140 |
| 2007/0226320 A1 * | 9/2007 | Hager et al. | ................. | 709/219 |

OTHER PUBLICATIONS

Online reorganization of databases, Gary Sockut, Balakrishna Iyer, ACM, 2009, p. 1-136.*
IEEE, no matched results, Nov. 9, 2009, p. 1.*
Introduction to maicrosoft sync framework file synchronization provider, Microsoft Corporation, Oct. 2009, google.com, pp. 1-8.*

* cited by examiner

*Primary Examiner*—Mohammad Ali
*Assistant Examiner*—Donald Lawson
(74) *Attorney, Agent, or Firm*—Yee & Associates, P.C.; Arthur J. Samodovitz

(57) ABSTRACT

System, method and program for making same data available from different file systems to clients. The data is transferred to each of the file systems. Respective time periods required to rename the data in the file systems from a first name to a second name are estimated. The data with the first name is not available to the clients. The data with the second name is available to the clients. Renaming of the data in the file systems from the first name to the second name is scheduled. The scheduling is based at least in part on the estimated respective time periods to rename the data in the file systems. Preferably, the scheduling is timed to result in completion of the renaming of the data in all of the file systems at approximately a same time. Preferably, one of the time periods to rename the data in the file systems is based at least in part on a time period to transfer the data to a server associated with the file system and a wait time within the server to schedule the renaming.

13 Claims, 7 Drawing Sheets

SYSTEM, METHOD AND PROGRAM TO SYNCHRONIZE FILES IN DISTRIBUTED COMPUTER SYSTEM

FIELD OF THE INVENTION

The present invention relates generally to computer systems, and more specifically to synchronization of files in a distributed computer system.

BACKGROUND OF THE INVENTION

Distributed computer systems are well known today. For example, a busy web site may employ multiple HTTP ("web") servers to deliver web pages and files to clients. Typically, the multiple HTTP servers are arranged in a pool for load balancing and backup purposes, and are intended to deliver the same web pages and files to clients upon their request. Ideally, the contents of the web pages and files delivered by all the web server at all times are the same, so that all clients receive the same content when making requests at the same time. There are known techniques to provide that the web servers deliver the same content.

One known technique is to provide a single, shared repository for the web pages and files, and each web server fetches and delivers the web pages and files from this single repository. However, there are problems with this technique—low reliability due to reliance on a single repository, low scalability due to the limited bandwidth and finite response time of a single repository.

Another known technique is for each web server to have its own storage for the web pages and files. As the content of a web page or file changes, a server furnishes the changed web page or file to each of the storages. To ensure that each web page or file is updated and made valid at the same time in each of the storages, a known two-phase commit procedure can be used.

An object of the present invention is to distribute new web pages and files to different storages of different web servers or other servers, and make them consistent across all of the servers.

SUMMARY OF THE INVENTION

The present invention resides in a system, method and program for making same data available from different file systems to clients. The data is transferred to each of the file systems. Respective time periods required to rename the data in the file systems from a first name to a second name are estimated. The data with the first name is not available to the clients. The data with the second name is available to the clients. Renaming of the data in the file systems from the first name to the second name is scheduled. The scheduling is based at least in part on the estimated respective time periods to rename the data in the file systems.

In accordance with features of the present invention, the scheduling is timed to result in completion of the renaming of the data in all of the file systems at approximately a same time. Preferably, one of the time periods to rename the data in the file systems is based at least in part on a time period to transfer the data to a server associated with the file system and a wait time within the server to schedule the renaming.

DETAILED DESCRIPTION OF THE PREFERRED EMBODIMENTS

Figure 1:
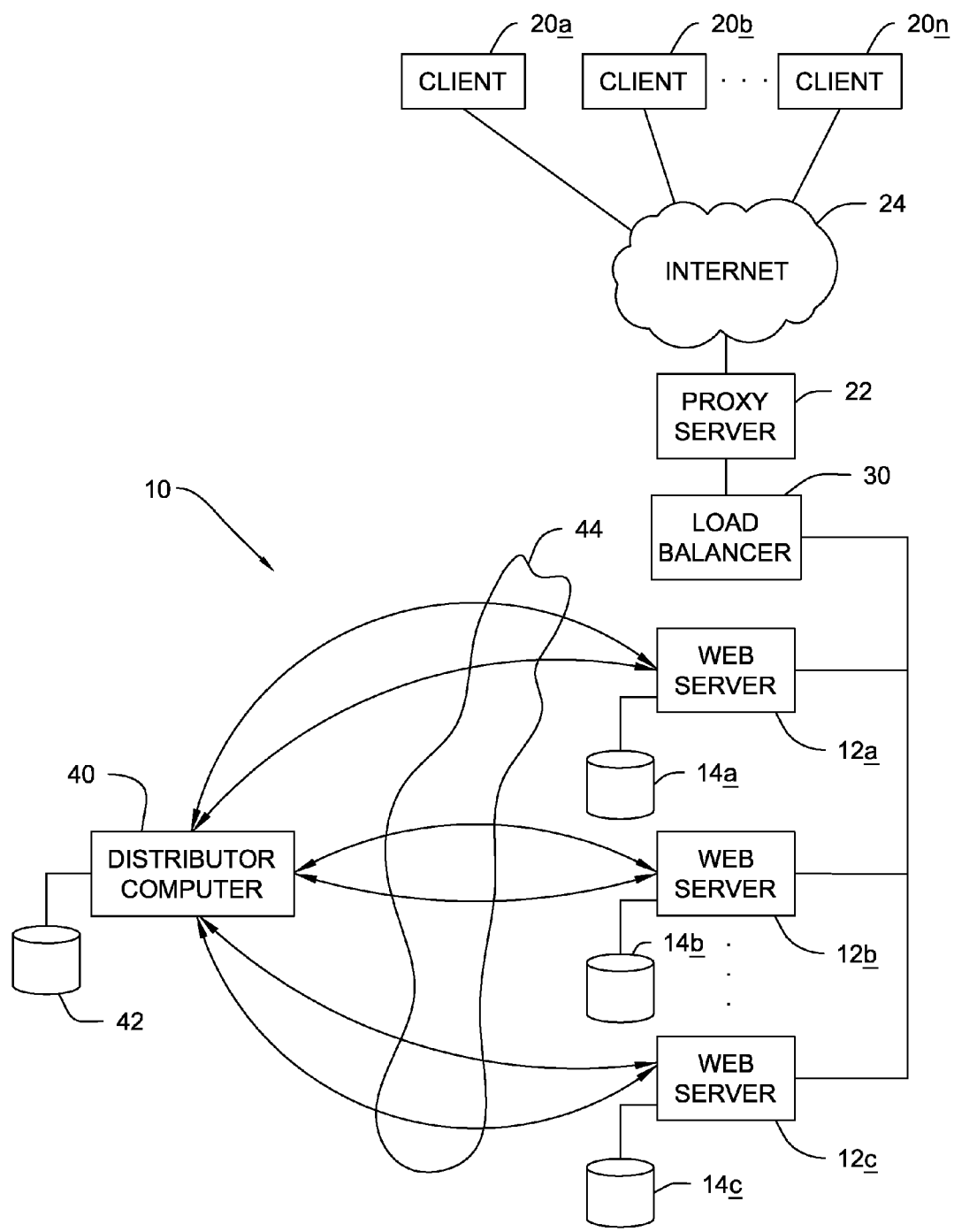
FIG. 1 is a block diagram of a distributed computer system including multiple web servers and a file distributor computer to provide new web pages and files to the web servers in a consistent manner, according to the present invention.

The present invention will now be described in detail with reference to the figures. FIG. 1 illustrates a distributed computer system generally designated 10, which includes the present invention. System 10 includes web servers 12a,b,c (although there can be many more than three), each with its own storage 14a,b,c (including a respective file manager). Each of the web servers 12a,b,c includes a CPU, operating system, RAM, ROM and storage 14a,b or c, respectively. Web pages and files are stored in storages 14a,b,c. Clients 20a,b . . . n (i.e. workstations with users) are coupled to a proxy server 22 via Internet 24. Clients 20a,b . . . n make requests to proxy server 22 for web pages and files in storages 14a,b,c, and proxy server 22 forwards the requests to a load balancer computer 30. By way of example, the requests can be HTTP, FTP, HTTPS, or Gopher. In response, load balancer 30 forwards each request to one of the web servers 12a,b,c according to a known load balancing algorithm (such as round robin). The foregoing features of system 10 were known in the art.

A distributor computer 40 includes a CPU, operating system, RAM, ROM and storage 42. In accordance with the present invention, distributor computer 40 delivers new web pages and files from its storage 42 to web servers 12a,b,c (via a network 44) in a consistent manner for storage in storages 14a,b,c and subsequent delivery by web servers 12a,b,c to clients 20a,b . . . n. With this consistency, when all clients 20a,b . . . n request the same web page or file, they receive the same web page or file. Thus, each web server 12a,b,c, at approximately the same time, makes the same web pages and files available to its clients. Network 44 can be an intranet, Internet, extranet, etc.

Figure 2:
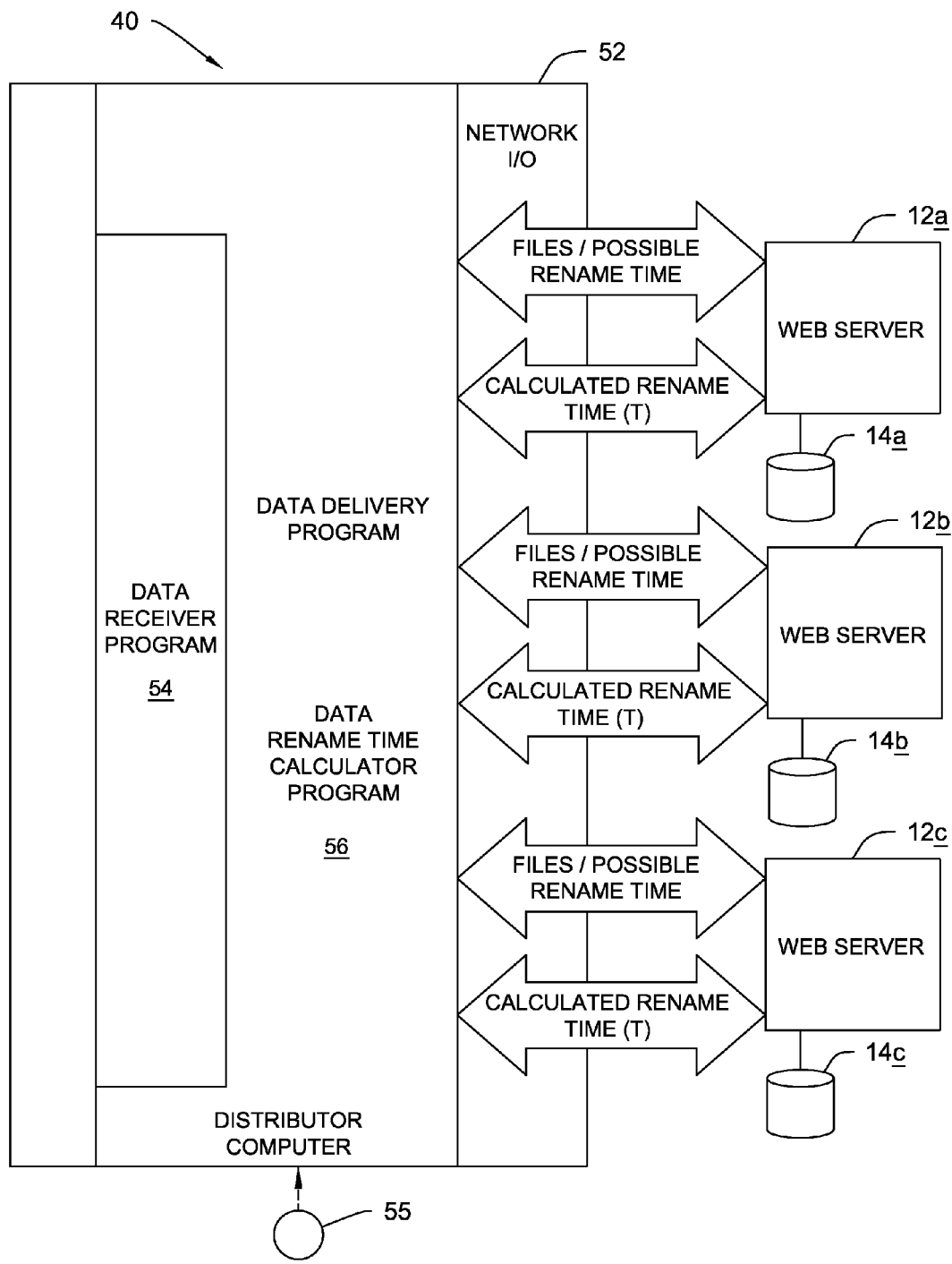
FIG. 2 is a more detailed block diagram of the file distributor computer of FIG. 1.

FIG. 2 illustrates the distributor computer 40 in more detail. Distributor computer 40 comprises a network I/O module 52 such as a TCP/IP card to interface to network 44, a data receiver program 54 to receive new web pages and files from upstream data delivery system (not shown), and a data delivery program 56. The upstream data delivery system can be a central repository for new web pages, and deliver them to the distributor computer 40 when the new web pages are received. Data delivery program 56 delivers the new web pages and files to web servers 12a,b,c. When the new web page or file is received from the distributor computer, and first stored in the web server's file system, it is stored with a temporary name. With the temporary name, the new web page or file is not available to clients, and does not yet replace the corresponding, old web page or file, if any. Data delivery program 56 learns from each of the web servers 12a,b,c an estimated "wait time" period of each of the web servers 12a,b,c to rename each new web page and file as the current web page and file (after the new web page or file is received at the web server). Typically, there are many other requests that need to be executed or are in process of execution. All requests compete for processor time, so the processor(s) cannot process all requests simultaneously. Consequently, after a request is received, it is not scheduled for immediate execution. Rather, there is some "wait time" until the processor(s) is available to perform the request. This "wait time" is the time required to complete requests scheduled for earlier times or requests in process of execution. Program 56 also determines the "transit time" for each web server, i.e. the time required for the rename request to travel from the distributor computer to each web server via one or more networks. Program 56 then uses the "transit time" and "wait time" to synchronize the renaming of the new web pages or files at the web servers 12a,b,c to make them available to clients at approximately the same absolute time. Program 56 accommodates the latest-to-respond web server, i.e. the web server with the greatest combined (a) transit time to receive the rename request from the distributor computer 40 and (b) wait time period to perform the rename operation. Then, program 56 notifies each of the web servers 12a,b,c when to schedule the rename operation and thereby accept each new web page and file as valid/current. Thus, after each file system renames the new file, it becomes available to the clients, and replaces the corresponding old file, if any. Consequently, all web servers 12a,b,c can supply the same, new web page and/or file to their clients, upon their request.

Figure 3:
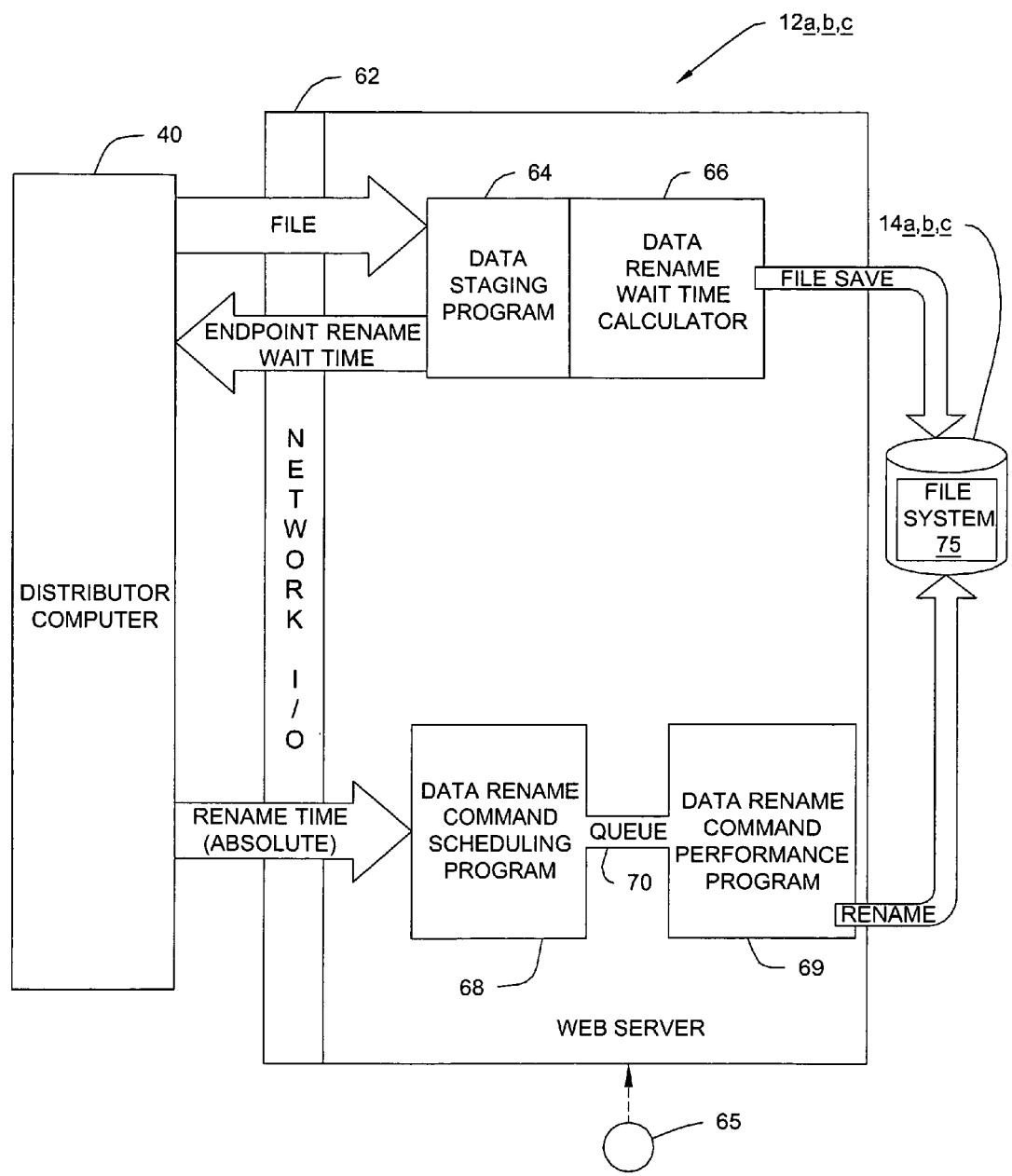
FIG. 3 is a more detailed block diagram of each of the web servers of FIG. 1.

FIG. 3 illustrates each of the web servers 12a,b,c in more detail. Each web server comprises a network I/O module 62, such as a TCP/IP card, to interface to network 24. Each web server also comprises a data staging program 64 to receive each new web page and file from the distributor computer 40 and store it in storage 14a,b,c (with a temporary name) awaiting acceptance/renaming as valid and current. Each web server 12a,b,c also comprises a data rename wait-time calculator program 66 to estimate the wait time required by the web server to get to a rename request. Each web server also comprises a data rename command scheduling program 68 which places rename requests on a rename queue 70. As noted above, the rename scheduling programs 68 within web servers 12a,b,c will schedule each new web page and file to be renamed at approximately a same time, upon request and as specified by the distributor computer 40. In addition each web server 12a,b,c also comprises a data rename command performance program 69 which takes rename operations from queue 70 and performs them at the scheduled time.

Figure 4A:
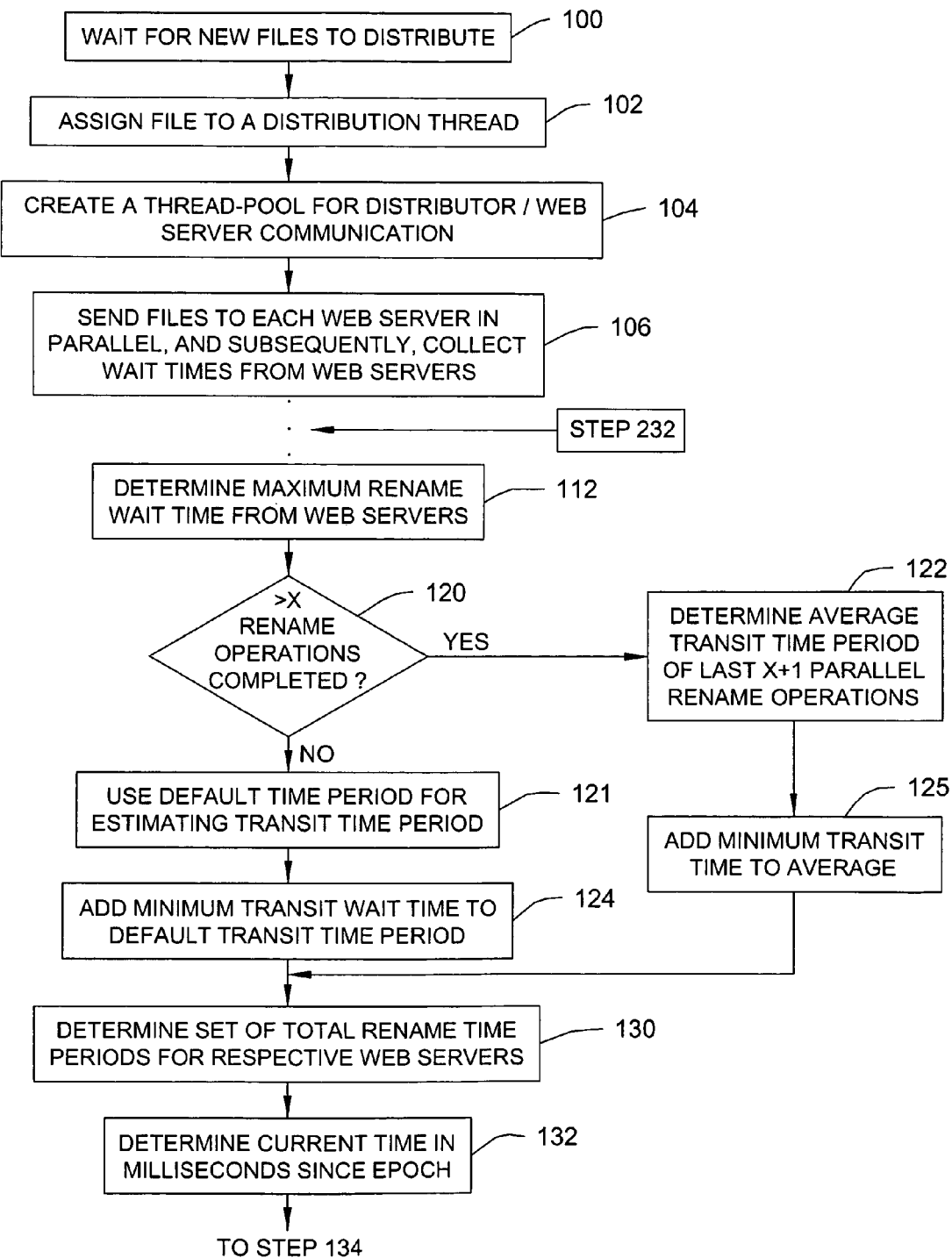
FIGS. 4(a) and 4(b) form a flow chart of a data receiver program and a data delivery program within the content distributor computer of FIG. 1.
Figure 4B:
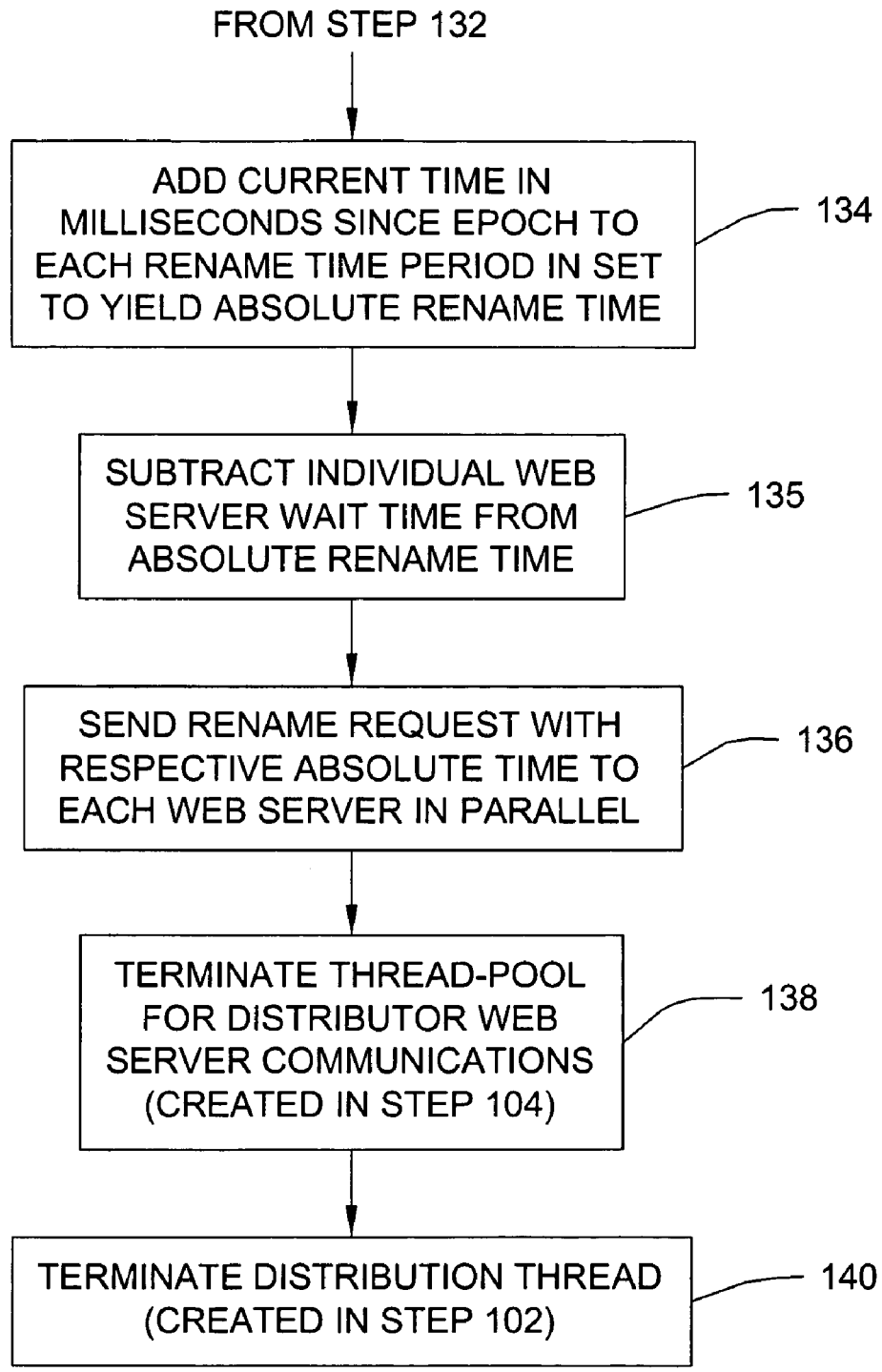

FIGS. 4(a) and 4(b) illustrate the data receiver program 54 and data delivery program 56 in more detail. In step 100, data receiver program 54 waits for new web pages and files from an upstream data delivery system. Upon receipt, program 54 assigns the new web page or file to a data distribution program thread within data delivery program 56 (step 102). (If no such thread is available, then program 54 creates the data distribution thread.) Next, program 54 creates a thread-pool for communication between the data delivery program 56 and each of the web servers 12a,b,c (step 104). A "thread-pool" is a group of threads that execute similar tasks and can be reused. Next, the data delivery program 56 sends the new web page or file to each of the web servers 12a,b,c, preferably in parallel, and receives wait time information from each web server (step 106).

Figure 5:
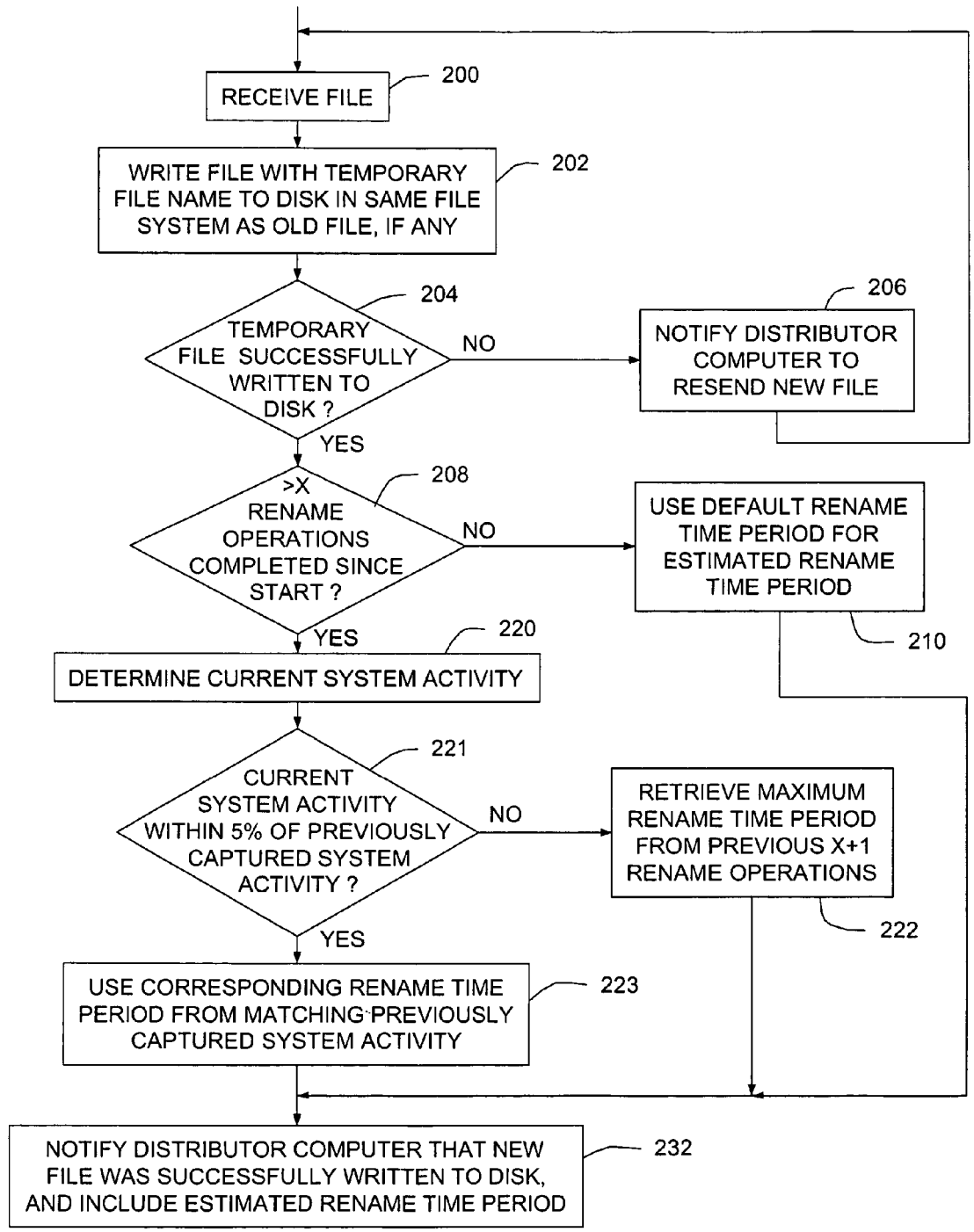
FIG. 5 is a flow chart of a data staging program and a file rename wait time calculator program within each of the web servers of FIGS. 1 and 3.

FIG. 5 illustrates processing by the data staging program 64 and data rename wait-time calculator program 66 within each of the web servers 12a,b,c to determine its current wait time period, in response to receipt of the new web page or file from distributor computer 40. In step 200, program 64 receives the new web page or file from the data delivery program 56. In response, program 64 writes the new web page or file into storage 14a,b,c, and assigns a temporary file name to the new web page or file (step 202). Program 64 writes the new web page or file into a same file system 75 (in each storage 14a,b,c) as the file-system containing the old web page or file being updated. Next, program 64 determines, based on a return code supplied by a file manager of file system 75, whether the new web page or file was successfully written to file system 75 in storage 14a,b,c (decision 204). If not, then program 64 notifies the data delivery program 56 of the problem (so the data delivery program can re-send the new web page or file) (step 206). However, if the new web page or file was successfully written to file system 75 (decision 204, no branch), then program 64 initiates the data wait-time calculator program 66. In response, the wait time calculator program 66 determines if there have been more than a predetermined number x such as nine, previous calculations of the wait time period since the program 66 was started (decision 208). If not, then program 66 notes a default time period as the wait time period required to rename the new web page or file (step 210). (This default time will be used for the first ten new web pages or files which have been received since program 66 was started.) Next, program 66 notifies the data delivery program 56 within distributor computer 40 that the new web page or file was successfully received and the estimated wait time period to use for renaming the received web page or file (step 232). Refer again to decision 208, yes branch, where there were ten or more previous rename requests. In such a case, program 66 identifies the wait time period by comparing current system activity to previously captured system activity in program 69. Program 69 stored the actual time it took to rename other files during differing levels of system activity. Program 66 determines the current system activity, or burden (step 220). If there is no stored value within 5% of current system activity (decision 221, no branch), then program 66 uses the maximum actual rename times from the most recent ten rename operations stored by program 69 (step 222). This provides a "safe" value if a close system activity match is not available. Otherwise the value derived from the yes branch of decision 221 is used (step 223). Program 66 calculates system activity based on the following algorithm:

SYSTEM ACTIVITY=3+(BLOCKS IN PER SECOND+BLOCKS OUT PER SECOND)/10+
(SYSTEM TIME/100+USER TIME/100)×15, where "blocks IN per second" is a measure of how much data has been read in from storage during a predetermined period, and "blocks OUT per second" is a measure of how much data has been written out to storage during the predetermined period. The more data read in from storage and written out to storage the higher the level of system activity/burden. "System time" is the time during the period during which the operating system is utilizing the processor. "User time" is the time during the period during which application(s) are utilizing the processor. Alternately, the measure of current level of system activity can be based on a system utilization metric provided by a known UNIX vmstat utility.

Next, program 66 notifies the data delivery program 56 within distributor computer 40 that the new web page or file was successfully received and also notifies the data delivery program 56 of the adjusted current wait time period (step 232).

Referring again to FIGS. 4(A) and 4(B), after the data delivery program 56 receives the adjusted current wait time periods from programs 66 of all of the web servers 12a,b,c (step 106), program 56 determines which of the wait time periods is greatest for all of the web servers 12a,b,c (step 112). Next, program 56 determines if there have been more than a predetermined number x, such as nine, rename request operations to the web server since program 56 was started (decision 120). If not, then program 56 identifies a default transit time period for sending the rename request to the web server (step 121). Next, program 56 adds a minimum transit time period to the default transit time period (step 124). The "minimum" transit time period allows for unexpected delays in transmission, and processor availability, etc. By way of example, the minimum transit time period can be one half second. Refer again to decision 120, yes branch where there have been more than the predetermined number of rename request operations since program 56 was started. In this case, program 56 determines an average transit time period of the last predetermined number x+1, such as ten, rename request operations sent to the web server (step 122). Next, program 56 adds the minimum transit time period to the average transmit time period determined in step 122 (step 125).

After step 124 or step 125, program 56 creates a relative rename time period, i.e. when all web servers 12a,b,c can be scheduled (at the same time) to perform the respective rename operation from the present (EPOCH) time (step 130). (This assumes that the real/clock time recognized by each of the web servers 12a,b,c is the same. The web servers 12a,b,c synchronize their real/clock time using Network Time Protocol.) Next, program 56 obtains the current/absolute (EPOCH) time (step 132). Next, program 56 adds the relative rename time period determined in step 130 to the current/absolute time to yield an absolute rename time (step 134). Next, program 56 subtracts the individual received wait times from step 106 from the absolute rename time for each web server, and records the result for each web server (step 135). The absolute rename time for each web server 12a,b,c is the time to perform the rename operation within the web server. Next, program 56 sends the respective result of step 135 to each web server, i.e. the absolute rename time minus the respective wait time for the respective web server, to each of the web servers 12a,b,c in parallel (step 136). This will result in all of the web servers 12a,b,c renaming the new web page or file at the same time. Next, program 56 terminates the thread-pool created in step 104 (step 138). Next program 56 terminates the program thread created in step 102 (step 140).

Figure 6:
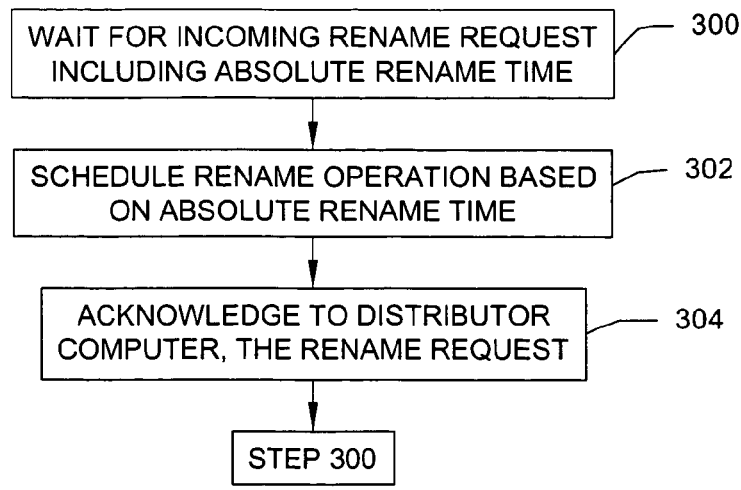
FIG. 6 is a flow chart of a rename command scheduling program within each of the web servers of FIGS. 1 and 3.

As illustrated in FIG. 6, in step 300, the data rename command scheduling program 68 in each web server 12a,b,c receives its absolute rename time sent by program 56 in step 136. In response, the rename program in each web server 12a,b,c schedules a rename operation for execution at the absolute rename time (step 302). Program 68 schedules the rename operation by placing the operation into a "schedule-queue" in which the operation is only taken off the queue (queue 70) by program 69 at the scheduled time. Then, program 68 returns an acknowledgment to program 56 that the rename operation has been scheduled (step 304).

Figure 7:
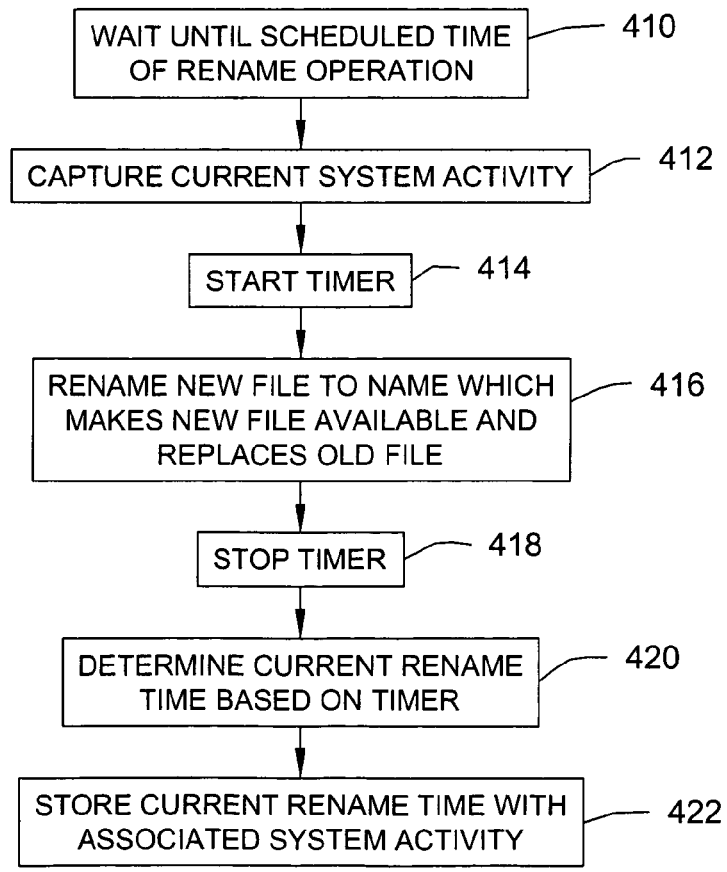
FIG. 7 is a flow chart of a rename command performance program within each of the web servers of FIGS. 1 and 3.

As illustrated in FIG. 7, when the scheduled rename time occurs to perform the rename operation in each web server (step 410), program 68 captures current system activity in the web server in which it resides (step 412). As explained above, the current system activity indicates the degree to which the web server is burdened. The greater the burden, the slower the rename operation. By way of example, the current level of system activity can be based on the algorithm described above with reference to step 222 or a system utilization metric provided by a known UNIX vmstat utility. Next, program 69 initiates a timer to time the actual time to rename the new web page or file, once started (step 414). Then, program 69 renames the web page or file from its temporary name assigned in step 202 to a usable name (step 416). If the new web page or file replaces an old web page or file, before renaming the new web page or file in step 416, program 69 deletes or renames with a bogus name, the old web page or file, and then renames the new web page or file with the name of the old web page or file before it was deleted or renamed with the bogus name. Then, program 69 stops the timer (step 418), and calculates the actual time to rename the new web page or file within the web server, once scheduled (step 420). Next, program 69 stores the actual time to rename the new web page or file with the record of the system activity captured in step 412 (step 422). This is stored so that program 66, can subsequently use the system activity mapped with actual rename time to supply an estimated wait time period to delivery program 56 in step 221 for another file to rename. (A rename request operation is done in parallel (using a separate thread) with other operations scheduled for the same time or prior time if not yet completed. At the scheduled time, the operating system invokes a thread to perform the rename operation. The time in which the web server completes the rename requested operation after the scheduled time depends on the load experienced by the processor, i.e. the availability of the processor time when shared by the other threads.)

Programs 54 and 56 can be loaded into distributor computer 40 from a computer readable media 55 such as magnetic disk or tape, optical disk, DVD, semiconductor memory, etc. or from network media via network I/O device 52 and the Internet.

Programs 64, 66, 68 and 69 can be loaded into each web server 12a,b,c from a computer readable media 65 such as magnetic disk or tape, optical disk, DVD, semiconductor memory, etc. or from network media via network I/O device 62 and the Internet.

Based on the foregoing, system, method and program product have been disclosed for providing web pages and files in different storages in a consistent manner. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for making same web content available from a plurality of different file systems associated with a plurality of web servers to a plurality of clients accessing said different file systems, said method comprising the steps of:

transferring for storage said same web content to a respective file system of said different file systems associated with a respective web server of said plurality of web servers in parallel, said same web content comprising one of: web pages and web files, and wherein said same web content is stored in said respective file system with a respective first name;

calculating respective time periods required to rename said same web content stored in said respective file system associated with said respective web server from said respective first name to a respective second name, said same web content with said respective first name not being available to said clients accessing said different file systems associated with said plurality of web servers, said same web content with said respective second name being available to said clients accessing said different file systems associated with said plurality of web servers; and synchronizing renaming of said same web content in said different file systems associated with said plurality of web servers from said respective first name to said respective second name based on said respective time periods calculated to rename said same web content in said different file systems associated with said plurality of web servers and scheduling renaming of said same web content in each of said different file systems associated with said plurality of web servers at a same time, wherein said same web content is available to said plurality of clients at said same time from said different file systems associated with said plurality of web servers.

2. A method as set forth in claim 1, wherein said respective time periods calculated to rename said same web content in said different file systems associated with said plurality of web servers is based on a respective time period to transfer said same web content to said respective file system associated with respective web server and a respective wait time within said respective web server to synchronize said renaming, wherein said renaming is performed on said respective web server at said same time as said renaming performed on another web server associated with another file system of said different file systems associated with said plurality of web servers.

3. A method as set forth in claim 2, wherein said transferring step occurs before said calculating and synchronizing steps.

4. A method as set forth in claim 3, wherein said calculating step further comprises the step of:
collecting, from each of said different file systems associated with said plurality of web servers, respective wait times for said renaming of said same web content, wherein each of said different file systems associated with said plurality of web servers reports one or more actual, recent time periods waiting to schedule said renaming, said calculating step being based on part on said one or more actual, recent time periods reported.

5. A method as set forth in claim 4, wherein said synchronizing renaming step further comprises the steps of:
calculating a respective absolute rename time for each of said different file systems associated with said plurality of web servers to begin said renaming of said same web content at said same time; and
sending said respective absolute rename time calculated to each of said different file systems associated with said plurality of web servers for scheduling renaming of said same web content at said same time in each of said different file systems associated with said plurality of web servers.

6. A method as set forth in claim 5, wherein said scheduling renaming step is performed by a web server of said plurality of web servers, and wherein said synchronizing renaming step is performed by a distributed computer system.

7. A method as set forth in claim 6, wherein said synchronizing renaming step is performed at least in part by a web server and a distributed computer system.

8. A computer program product for making same data available from a plurality of different file systems to a plurality of clients accessing said different file systems, said computer program product comprising
a computer readable media;
first program instructions to initiate transfer of said same data to each of said different file systems in parallel;
second program instructions to estimate respective time periods required to rename said same data in said file systems from a first name to a second name, said same data with said first name not being available to said clients accessing said file systems, said same data with said second name being available to said clients accessing said file systems; and
third program instructions to synchronize renaming of said same data in said file systems from said first name to said second name based on estimated respective time periods to rename said same data in said file systems and to schedule renaming of said same data in each of said file systems at approximately a same time, wherein said same data is available to said clients at said same time from said different file systems, and wherein said first, second and third program instructions are stored on said media for execution by a computer.

9. A computer program product as set forth in claim 8, wherein said second program instructions base said estimated respective time periods to rename said same data in said file systems on a time period to transfer said same data to a server associated with a file system and a wait time within said server to synchronize said renaming, wherein said renaming is performed on said server at approximately said same time as said renaming performed on another server associated with another file system of said different file systems.

10. A computer program product as set forth in claim 9, wherein said first program instructions initiate transfer of said data before said second program instructions estimate said respective time periods and said third program instructions synchronize said renaming.

11. A system for making same web content available from a plurality of different file systems associated with a plurality of web servers to a plurality of clients accessing said different file systems associated with said plurality of web servers, said system comprising:
means for transferring said same web content to a respective file system of said different file systems associated with a respective web server of said plurality of web servers in parallel, said same web content comprising one of: web pages and web files, and wherein said same web content is stored in said respective file system with a respective first name;
means for calculating respective time periods required to rename said same web content stored in said respective file system associated with said respective web server of said plurality of web servers from said respective first name to a respective second name, said same web content with said respective first name not being available to said clients accessing said different file systems associated with said plurality of web servers, said same web content with said respective second name being available to said clients accessing said different file systems associated with said plurality of web servers; and
means for synchronizing renaming of said same web content in said different file systems associated with said plurality of web servers from said respective first name to said respective second name based on said respective time periods calculated to rename said same web content in said different file systems associated with said plurality of web servers and scheduling renaming of said same web content in each of said different file systems associated with said plurality of web servers at a same time, wherein said same web content is available to said plurality of clients at said same time from said different file systems associated with said plurality of web servers.

12. A system as set forth in claim 11, wherein one of said respective time periods calculated to rename said same web content in said different file systems associated with said plurality of web servers is based on a respective time period to transfer said same web content to said respective file system associated with said respective web server and a respective wait time within said respective web server to synchronize said renaming, wherein said renaming is performed on said respective web server at said same time as said renaming performed on another web server associated with another file system of said different file systems associated with said plurality of web servers.

13. A system as set forth in claim 11, wherein said means for transferring transfers said same web content before said means for calculating calculates said respective time periods and said means for synchronizing said renaming.

* * * * *